(12) United States Patent
Johnson

(10) Patent No.: US 6,717,389 B1
(45) Date of Patent: Apr. 6, 2004

(54) METHOD AND APPARATUS FOR CURRENT CONTROLLED TRANSIENT REDUCTION IN A VOLTAGE REGULATOR

(75) Inventor: Duane C. Johnson, White Bear Lake, MN (US)

(73) Assignee: Unisys Corporation, Blue Bell, PA (US)

( * ) Notice: Subject to any disclaimer, the term of this patent is extended or adjusted under 35 U.S.C. 154(b) by 178 days.

(21) Appl. No.: 10/027,065

(22) Filed: Dec. 21, 2001

(51) Int. Cl.[7] .............................. G05F 1/56; G05F 1/613
(52) U.S. Cl. ........................................ 323/282; 323/223
(58) Field of Search ................................. 323/220, 223, 323/225, 226, 233, 268, 270, 271, 273, 275, 282, 285; 363/39–41

(56) References Cited

U.S. PATENT DOCUMENTS

| | | | | |
|---|---|---|---|---|
| 4,008,418 A | * | 2/1977 | Murphy | 361/18 |
| 5,770,940 A | * | 6/1998 | Goder | 323/282 |
| 5,828,204 A | * | 10/1998 | Jansen | 323/666 |
| 6,441,594 B1 | * | 8/2002 | Connell et al. | 323/274 |
| 6,559,627 B2 | * | 5/2003 | Khouri et al. | 323/282 |
| 6,587,490 B2 | * | 7/2003 | Crawford | 372/328.07 |

* cited by examiner

Primary Examiner—Matthew V. Nguyen
(74) Attorney, Agent, or Firm—Charles A. Johnson; Mark T. Starr; Crawford Maunu, PLLC

(57) ABSTRACT

A method and apparatus for substantially eliminating ripple and transient voltage using a current controlled voltage regulator. Current control (460) senses load current ($i_L$) changes and produces control voltage ($V_{CONTROL}$) in response to the load current changes. The control voltage increases the conductivity state of shunt transistor (470) such that any deficit of current caused by load changes at load (420) during a positive voltage transient is conducted through shunt transistor (470). The control voltage decreases the conductivity state of shunt transistor (470) such that any excessive current caused by load (420) during a negative voltage transient is balanced by the reduction of current in shunt transistor (470).

19 Claims, 6 Drawing Sheets

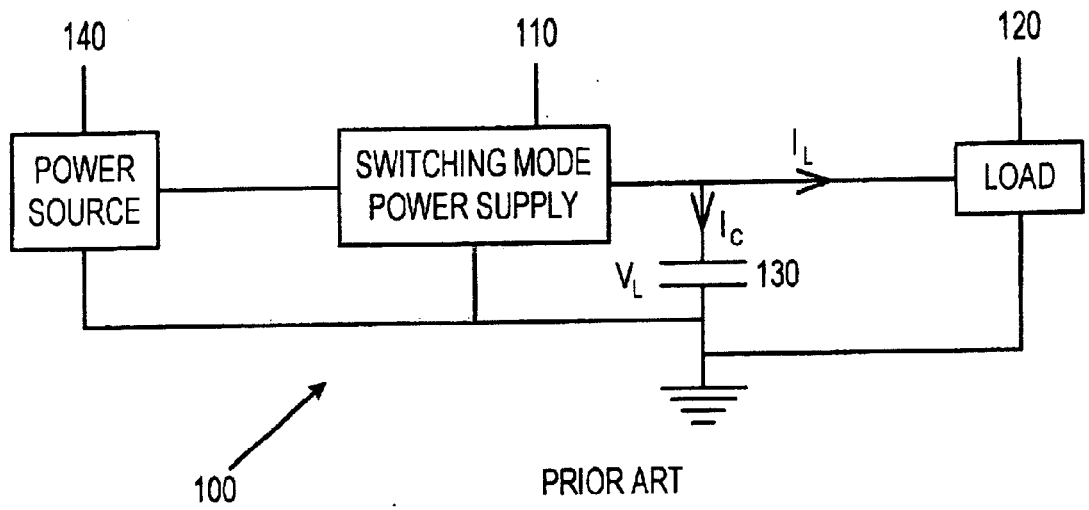
PRIOR ART
FIG. 1
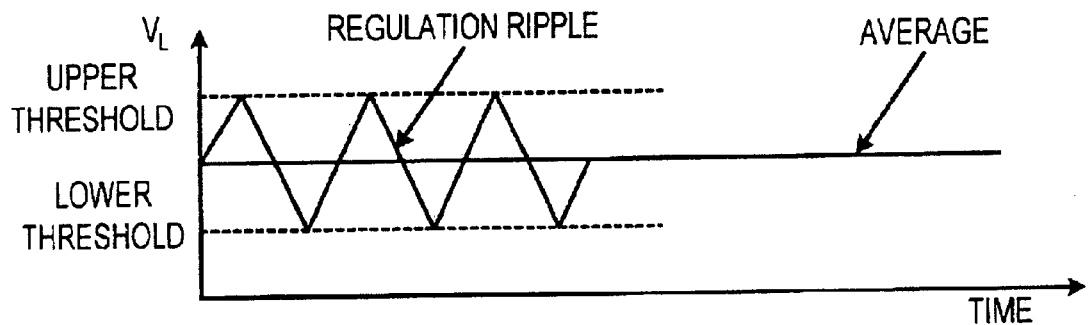
PRIOR ART   FIG. 2
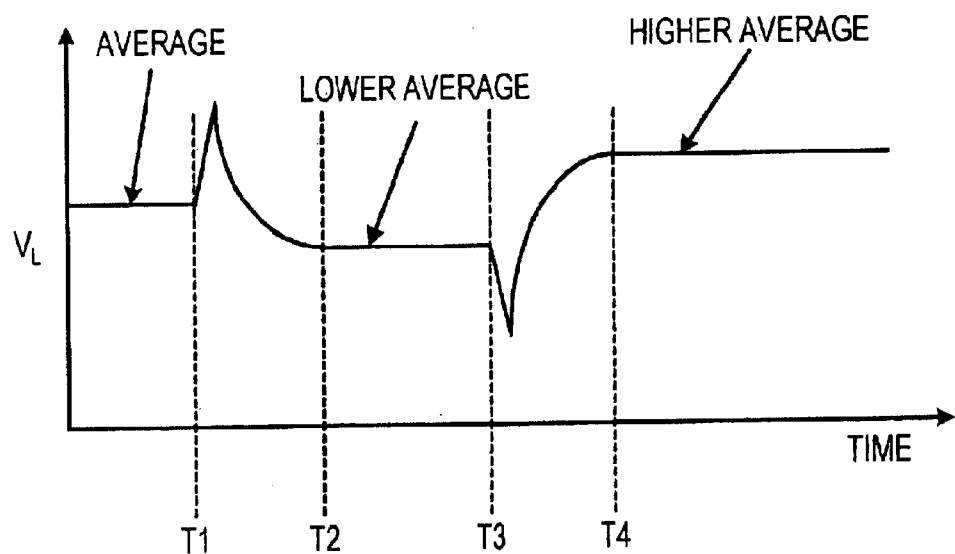
FIG. 3   PRIOR ART

METHOD AND APPARATUS FOR CURRENT CONTROLLED TRANSIENT REDUCTION IN A VOLTAGE REGULATOR

FIELD OF THE INVENTION

This invention relates generally to voltage regulation circuits, and more particularly, to current controlled voltage regulation circuits using shunt current control components to minimize the change in load current presented to the power supply.

BACKGROUND OF THE INVENTION

Voltage regulation circuits are required in virtually all electronic applications requiring Direct Current (DC) voltage levels to operate properly. The DC voltage levels are generally derived from an Alternating Current (AC) voltage source, such as a wall mounted AC voltage receptacle or AC voltage generator, and present potentially destructive voltage transients at their respective DC output voltage terminals. Switching mode DC power supplies, as opposed to linear mode power supplies, are often employed to derive the DC supply voltages from the AC voltage power sources, since the higher load currents required of the electronic applications are more readily and efficiently generated using the switching mode power supplies. As a result, transients associated with the fundamental and harmonic components of the switching frequency of the switching mode power supply may contribute to voltage transients on the DC output voltage terminals. Varying load conditions at the DC output voltage terminals are also responsible for voltage transients on the DC output voltage terminals.

The DC supply voltage may also be generated from a DC power source, such as a battery. Battery powered portable laptop computing platforms, for example, generally utilize a switching mode power converter to generate a DC power supply voltage from a DC battery voltage. In general, whether the DC voltage is generated from an AC or DC power source, voltage regulation is required to minimize transient activity at the DC supply voltage terminals.

Varying load conditions at the DC supply voltage terminals significantly contributes to the transient activity. As the load requires more supply current from the DC supply voltage terminals, for example, a dip in the DC supply voltage may be generated due to the inability of the DC-DC converter to react to the increasing current demand. As a result, a voltage dip is generated at the load terminals while the DC-DC converter changes its switching characteristics to accommodate the change in current required by the load. Conversely, as the load requires less current, a corresponding surge in supply voltage is generated at the load terminals, since the DC-DC converter is generating a surplus of current, which causes a surge in the load voltage.

Prior art techniques used to mitigate voltage transients at the load terminals employ increased bulk capacitance values or higher switching frequencies of the DC-DC converters. Increased bulk capacitance levels are effective to provide an increased instantaneous current capability. The larger bulk capacitor can react to increased loading conditions by supplying the instantaneous current required by the load until the DC-DC converter has had time to respond to the transient loading condition. The bulk capacitors, however, are often implemented on a Printed Circuit Board (PCB). The larger bulk capacitors, therefore, require a larger portion of printed circuit board area and become impractical. Increased bandwidth of the DC-DC converter has a practical limit as well, since load transient bandwidth exceeds any practical DC-DC converter bandwidth.

Therefore, it would be desirable to provide a method and apparatus that does not require increased bulk capacitance nor increased DC-DC conversion bandwidth to mitigate voltage transients or ripple. The present invention provides a solution to these and other problems of the prior art, and offers other advantages over prior art voltage regulators. The present invention, for example, allows the designer to reduce the cost of the SMPS, since high-bandwidth operation of the SMPS is obviated through the use of the present invention.

SUMMARY OF THE INVENTION

The present invention relates to a method and apparatus for reducing output voltage transients, or ripple, due to time varying load current.

In accordance with one embodiment of the invention, a current controlled voltage regulator includes a control circuit that receives first and second signals indicative of a drive level of the voltage regulator. The control circuit provides a control signal in response to a difference between the first and second signals. A conduction device receives the control signal and decreases conduction if the difference increases and increase conduction if the difference decreases. The change in conduction is substantially proportional to the difference between the first and second signals.

In accordance with more specific embodiments of control circuit according to the invention, the control circuit includes an operational amplifier.

In accordance with another embodiment of the invention, the control circuit includes a first conversion device that receives the first signal and provides a digital representation of the first signal. A second conversion device that receives the second signal and provides a digital representation of the second signal. A third conversion device that receives the first and second digital representations and provides an analog representation of the difference between the first and second digital representations.

In accordance with more specific embodiments of conduction device according to the invention, the conduction device includes a transistor having a first conduction terminal to receive the first signal and a control terminal coupled to receive the control signal.

In accordance with more specific embodiments of the conduction device according to the invention, the transistor includes a field effect transistor.

In accordance with another embodiment of the invention, an article of manufacture comprises a program storage medium readable by a computer. The medium tangibly embodies one or more programs of instructions executable by the computer to perform a method of operating a current controlled voltage regulator. The method comprises receiving first and second signals indicative of a drive level of the voltage regulator, computing a difference between the first and second signals, and controlling a conductive state of a conduction device in response to the difference, wherein the conductive state is changed in proportion to the difference.

In accordance with more specific embodiments of the method to receive first and second signals according to the invention, the method includes using a resistive component to develop a potential difference between the first and second signals, wherein the potential difference is indicative of the drive level.

In accordance with more specific embodiments of the method to compute the difference according to the invention, the method includes receiving the first signal at an input of a first conversion device, receiving the second signal at an input of a second conversion device, and generating the difference at the output of a third conversion device.

In accordance with another embodiment of the invention, a method of operating a current controlled voltage regulator. The method comprises receiving first and second signals indicative of a drive level of the voltage regulator, measuring a difference between the first and second signals, and controlling a conductive state of a conduction device in response to the difference, wherein the conductive state is changed in proportion to the difference.

In accordance with more specific embodiments of the method to receive first and second signals according to the invention, the method includes using a resistive component to develop a potential difference between the first and second signals, wherein the potential difference is indicative of the drive level.

In accordance with more specific embodiments of the method to compute the difference according to the invention, the method includes receiving the first signal at a first input of an amplifier, receiving the second signal at a second input of the amplifier, and generating a substantially proportional difference at the output of the amplifier.

In accordance with another embodiment of the method to compute the difference according to the invention, the method includes receiving the first signal at an input of a first conversion device, receiving the second signal at an input of a second conversion device, and generating a substantially proportional difference at the output of a third conversion device.

In accordance with one embodiment of the invention, in a power supply a voltage regulator controlling output voltage to substantially eliminate voltage variations. The voltage regulator includes a current control circuit that receives first and second signals indicative of a drive level of the voltage regulator. The control circuit provides a control signal in response to a difference between the first and second signals. A current conduction device receives the control signal and increases conduction if the difference decreases and decreases conduction if the difference increases. The change in conduction is substantially proportional to the difference between the first and second signals.

In accordance with more specific embodiments of the current control circuit according to the invention, the current control circuit includes an operational amplifier.

In accordance with another embodiment of the invention, the current control circuit includes a first conversion device that receives the first signal and provides a digital representation of the first signal. A second conversion device that receives the second signal and provides a digital representation of the second signal. A third conversion device that receives the first and second digital representations and provides a signal that is substantially proportional to the difference between the first and second digital representations.

In accordance with more specific embodiments of the current conduction device according to the invention, the current conduction device includes a transistor having a first conduction terminal to receive the first signal and a control terminal coupled to receive the control signal.

In accordance with more specific embodiments of the current conduction device according to the invention, the transistor includes a field effect transistor.

In accordance with one embodiment of the invention, a current controlled voltage regulator includes a control means that receives first and second signals indicative of a drive level of the voltage regulator. The control means provides a control signal in response to a difference between the first and second signals. A conduction means receives the control signal and increases conduction if the difference decreases and decrease conduction if the difference increases. The change in conduction is substantially proportional to the difference between the first and second signals.

In accordance with more specific embodiments of control means according to the invention, the control means includes an operational amplifier.

In accordance with another embodiment of the invention, the control circuit includes a first conversion means that receives the first signal and provides a digital representation of the first signal. A second conversion means that receives the second signal and provides a digital representation of the second signal. A third conversion means that receives the first and second digital representations and provides a signal that is substantially proportional to the difference between the first and second digital representations.

In accordance with more specific embodiments of conduction means according to the invention, the conduction means includes a transistor having a first conduction terminal to receive the first signal and a control terminal coupled to receive the control signal.

In accordance with more specific embodiments of the conduction means according to the invention, the transistor includes a field effect transistor.

Still other objects and advantages of the present invention will become readily apparent to those skilled in this art from the following detailed description. As will be realized, the invention is capable of other and different embodiments, and its details are capable of modification without departing from the scope and spirit of the invention. Accordingly, the drawing and description are to be regarded as illustrative in nature, and not as restrictive.

BRIEF DESCRIPTION OF THE DRAWINGS

The invention is described in connection with the embodiments illustrated in the following diagrams.

FIG. 1 illustrates a prior art application of a switching mode power supply;

FIG. 2 and FIG. 3 illustrate diagrams useful in explaining the operation of the switching mode power supply of FIG. 1;

DETAILED DESCRIPTION OF THE ILLUSTRATED EMBODIMENTS

Figure 4:
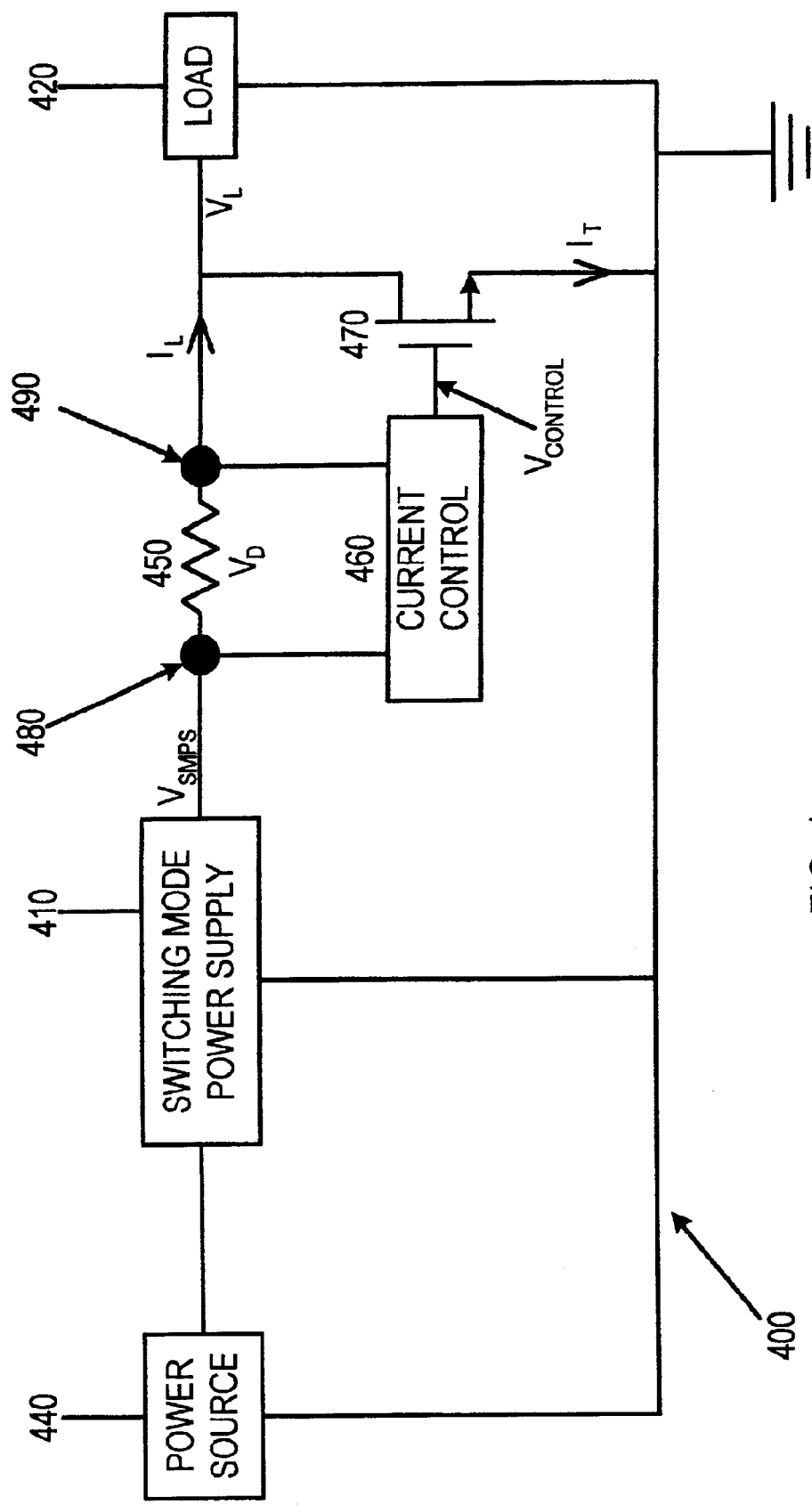
FIG. 4 illustrates a block diagram of a current controlled voltage regulator.

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

Generally, the present invention is directed to a method and apparatus for controlling voltage transients at the output of current controlled voltage regulators caused by changing current requirements of the load. A shunt current control circuit is applied across the voltage supply terminals of the current controlled voltage regulator. A current sense circuit is employed to sense the amount of current supplied to the load and effects a corresponding change in the shunt current control circuit to substantially eliminate the voltage transients at the load.

FIG. 1 illustrates a block diagram 100 of a prior art application of Switching Mode Power Supply (SMPS) 110. SMPS 110 receives input power from power source 140. Power source 140 supplies DC power to SMPS 110 either through rectification of an AC signal, through an SMPS pre-regulator, through direct connection to a battery, or other means. SMPS 110 implements a switched mode of power conversion from the DC level supplied by power source 140 to the regulated DC level required by load 120. SMPS no may implement any number of switching algorithms to provide the current $i_L$ and voltage $V_L$ as required by load 120.

In general, the operation of SMPS 110 is such that a primary winding of a transformer or an inductor internal to SMPS 110 either conducts current through a power transistor during a charging phase of SMPS 110 or blocks current through the power transistor during a discharging phase of SMPS 110. The charging phase is defined as the amount of time that current is conducted through the primary winding of the transformer or inductor. As current flows through the primary winding or inductor, inductive energy is stored in the primary until the current flow is halted. Once halted, the inductive energy stored in the primary winding or inductor, causes a current to flow in the output. The secondary current is then rectified and smoothed to provide the final output voltage. A directly proportional relationship exists between the length of the charging phase and the magnitude of the secondary current, such that the magnitude of the secondary current increases as the length of the charging phase increases. Conversely, the magnitude of the secondary current decreases as the length of the charging phase decreases. Regulation of the secondary current through control of the length of the charging phase is known as Pulse Width Modulation (PWM).

Alternately, the average amount of current conducted by the secondary can be modified simply by modifying the frequency of each charging phase while maintaining a constant length of the charging phase. Similarly, a directly proportional relationship exists between the frequency of each charging phase and the average amount of current conducted by the secondary, such that for increasing frequency, the secondary current increases and for decreasing frequency, the secondary current decreases. Regulation of the secondary current using the frequency of the charging phase is known as Pulse Frequency Modulation (PFM). A mixed mode of secondary current control exists, such that both the length and frequency of the charging phase is modulated, which yields a hybrid PWM/PFM modulation format.

Feedback control is typically implemented within SMPS 110 to monitor the voltage and/or current applied to load 120, such that the frequency and/or length of the charging phase according to the power requirements of load 120 is properly regulated. Typically, a lower and an upper threshold is established for the load voltage, $V_L$, such that SMPS 110 is effective to increase $V_L$ when $V_L$ drops below the lower threshold and decrease $V_L$ when $V_L$ increases above the upper threshold. As a result, a regulation ripple voltage is present at $V_L$, as illustrated in FIG. 2.

FIG. 2 illustrates the regulation ripple voltage present on load voltage $V_L$. An average level of $V_L$ exists between upper and lower excursions of $V_L$. The upper threshold represents the maximum voltage level of $V_L$ that is allowable by SMPS 120 and the lower threshold represents the minimum voltage level of $V_L$ that is allowable by SMPS 120. As discussed above, SMPS 120 is operative to maintain $V_L$ between the upper and lower thresholds through the use of an appropriate modulation technique.

FIG. 3 illustrates voltage transients $V_L$ caused by load variation at load 120. At time T1, load 120 reduces its power requirement, which reduces the amount of current $i_L$ required by load 120. SMPS 110, however, momentarily continues to produce the same level of current, which must be conducted by bulk capacitor 130, such that $i_L$ is decreased and $i_C$ is increased. As bulk capacitor 130 receives an increase in current $i_C$, the voltage $V_L$ across bulk capacitor 130 increases accordingly. Feedback within SMPS 110 reduces the amount of current produced, in accordance with a modulation reduction as discussed above, and voltage $V_L$ eventually settles to a lower average value of $V_L$ required by load 120 at time T2. At time T3, load 120 increases its load requirements, such that $i_L$ is forced to increase rapidly. Bulk capacitor 130 provides the increase in required load current $i_L$, however, the magnitude of $V_L$ is reduced accordingly, momentarily causing a voltage deficit at $V_L$. Feedback within SMPS increases the amount of current produced, in accordance with a modulation increase as discussed above, and voltage $V_L$ eventually settles to a higher average value required by load 120 at time T4.

FIG. 4 illustrates an exemplary block diagram of voltage regulator 400 according to one embodiment of the invention. Resistive element 450 is coupled in series between SMPS 410 and load 420. Resistive element 450 is shown to be a passive resistor, however, resistive element 450 may be implemented with any linear or non-linear resistive element, such as a Field Effect Transistor (FET) or diode, for example. Current control 460 is coupled to both conductors of resistor 450. A control terminal of transistor 470 is coupled to the output of current control 460. First and second conductors of transistor 470 are parallel coupled across load 420. Transistor 470 is illustrated to be a FET, however, any device whose conductivity state can be controlled using a control signal is acceptable. Devices whose conductivity state can be controlled using a control signal include bipolar transistors, relays, solid-state switches, etc.

In operation, SMPS 410 provides pulse modulation of an internal power transistor's control terminal, to regulate $V_L$ according to predetermined thresholds, as discussed above. As current $i_L$ is provided to load 420 by SMPS 410, a voltage $V_d$ is produced across resistor 450. At node 480, a voltage equal to $V_{SMPS}$ exists and at node 490, a load voltage, $V_L$, exists, where $V_L = V_{SMPS} - V_d$, such that the load voltage is directly proportional to the amount of load current $i_L$ flowing into load 420.

Current control 460 is effective to control the conductivity state of transistor 470 using $V_{CONTROL}$ in order to maintain the magnitude of voltage $V_L$ substantially constant. Transistor 470 is illustrated to be an N-type FET, but any conductivity type may be used. Accordingly, the conductivity state of transistor 470 is increased with an increased $V_{CONTROL}$ at the control terminal of transistor 470 and the conductivity state of transistor 470 is decreased with a decreased $V_{CONTROL}$ at the control terminal of transistor 470. Current control 460 is effective to increase $V_{CONTROL}$ as $V_L$ tends to increase and is effective to reduce $V_{CONTROL}$ as $V_L$ tends to decrease, such that transient voltages caused by load 420, as illustrated in FIG. 3, are substantially eliminated.

Behavior of voltage regulator 400 is facilitated with the use of FIG. 3. At a time prior to T1, a steady state condition exists such that voltage regulator 400 maintains an average load voltage equal to, $V_L$, and an average load current $i_L$, where transistor 470 conducts a nominal amount of current $i_T$. Current $i_T$ is directly proportional to the magnitude of $V_{CONTROL}$ produced by current control 460. At time T1, a voltage transient occurs due to the current requirement reduction of load 420. The current $i_L$ produced by SMPS 410 continues to flow, which causes a tendency to increase $V_L$. An increasing voltage at $V_L$ produces a decreasing voltage $V_d$. Current $i_L$ is, therefore, decreased by an amount proportional to the decrease in voltage across resistor 450. Current control 460 detects the decreasing voltage $V_d$ and increases the magnitude of $V_{CONTROL}$ accordingly. The increase in $V_{CONTROL}$ is effective to increase the conductivity state of transistor 470, such that the decrease in current $i_L$ is substantially restored by increasing the current conducted through transistor 470. That is to say, that the transient decrease in load current $i_L$ caused by the decrease in load requirements of load 420 is substantially eliminated by the conductivity state of transistor 470, since transistor 470 effectively conducts the entire decrease in load current $i_L$. SMPS 410 eventually adjusts, through feedback, the pulse modulation such that $V_L$ is returned to a lower steady state value at time T2. Load voltage $V_L$ presented to load 420, through the operation of current control 460 and transistor 470, is substantially held constant throughout the transient condition between time T1 and T2, since the load voltage $V_L$ is substantially equal to $i_T*R_{ds}$, where $i_T$ is the current conducted by transistor 470 and $R_{ds}$ is the drain to source resistance of transistor 470.

Conversely, at time T3, a voltage transient occurs due to the current requirement increase of load 420. Current $i_L$, however, does not instantaneously increase, which causes a tendency to decrease $V_L$. A decrease in $V_L$ produces an increase in voltage $V_d$. Current $i_L$ is, therefore, increased by an amount proportional to the increase in voltage across resistor 450. Current control 460 detects the increase in voltage $V_d$ and decreases the magnitude of $V_{CONTROL}$ accordingly. The decrease in $V_{CONTROL}$ is effective to decrease the conductivity state of transistor 470, such that the amount of current conducted by transistor 470 is decreased by the amount of increased current $i_L$. That is to say, that the increase in load current $i_L$ caused by the increase in load requirements of load 420 is substantially eliminated by the conductivity state of transistor 470, since the amount of current conducted by transistor 470 is effectively reduced by an amount equal to the increase in load current $i_L$. SMPS 410 eventually adjusts, through feedback, the pulse modulation such that $V_L$ is returned to a higher steady state value at time T4. Load voltage $V_L$ presented to load 420, through the operation of current control 460 and transistor 470, is substantially held constant throughout the transient condition between time T3 and T4, since the load voltage $V_L$ is substantially equal to $i_T*R_{ds}$, where $i_T$ is the current conducted by transistor 470 and $R_{ds}$ is the drain to source resistance of transistor 470.

It should be noted that voltage regulator 400 is operative to substantially eliminate the ripple voltage as illustrated in FIG. 2 in like manner. Any ripple voltage more positive than the average voltage results in an increase in the conductivity state of transistor 470 and any ripple voltage more negative than the average voltage results in a decrease in the conductivity state of transistor 470. Therefore, ripple voltage, similarly to transient voltage, is substantially eliminated by voltage regulator 400.

Figure 5:
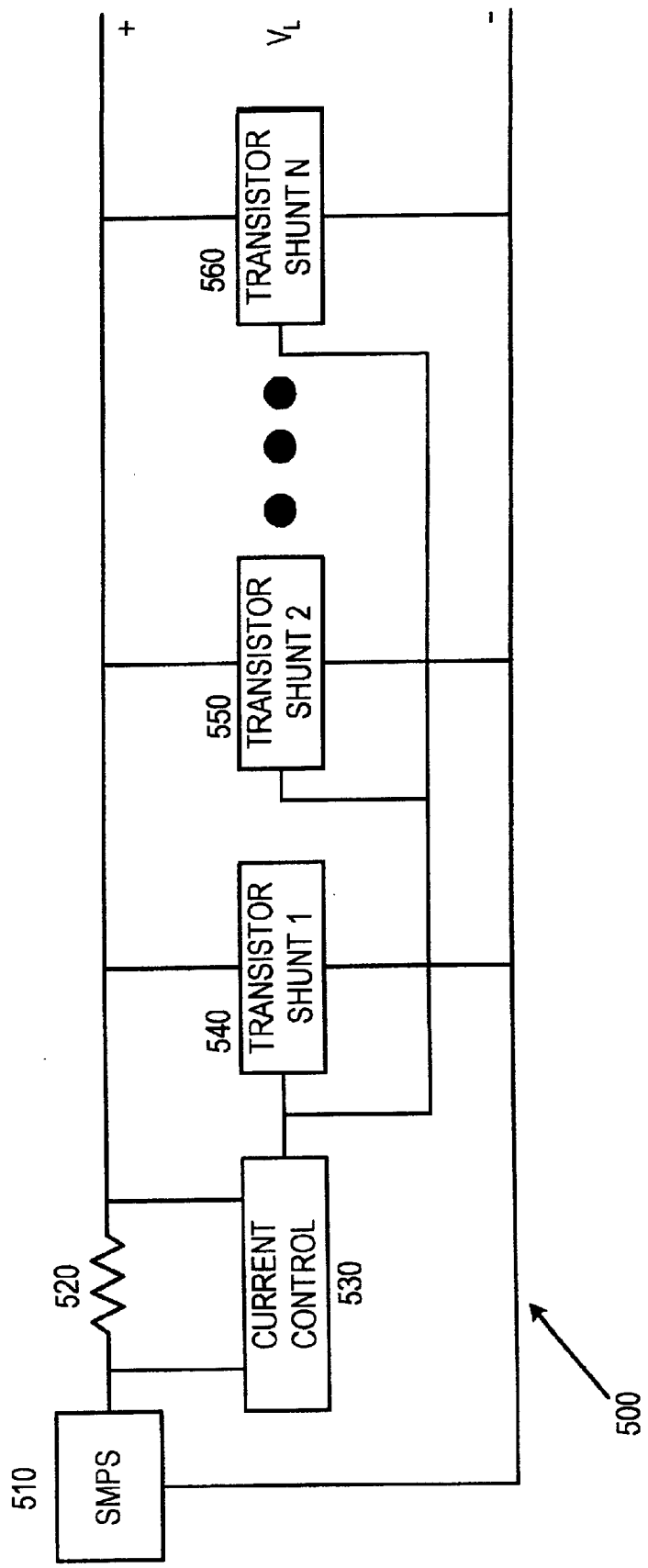
FIG. 5 illustrates a block diagram of one embodiment of a current controlled voltage regulator.

In accordance with one embodiment of the invention, FIG. 5 illustrates voltage regulator 500 employing multiple transistor shunts 540, 550, . . . , 560 whose conductivity states are controlled using common current control 530. Multiple transistor shunts may be required when the transistor families used for the transistor shunts do not provide adequate current conduction capability. The multiple transistor shunts combine in parallel to substantially eliminate voltage transients at $V_L$ as discussed earlier.

Figure 6:
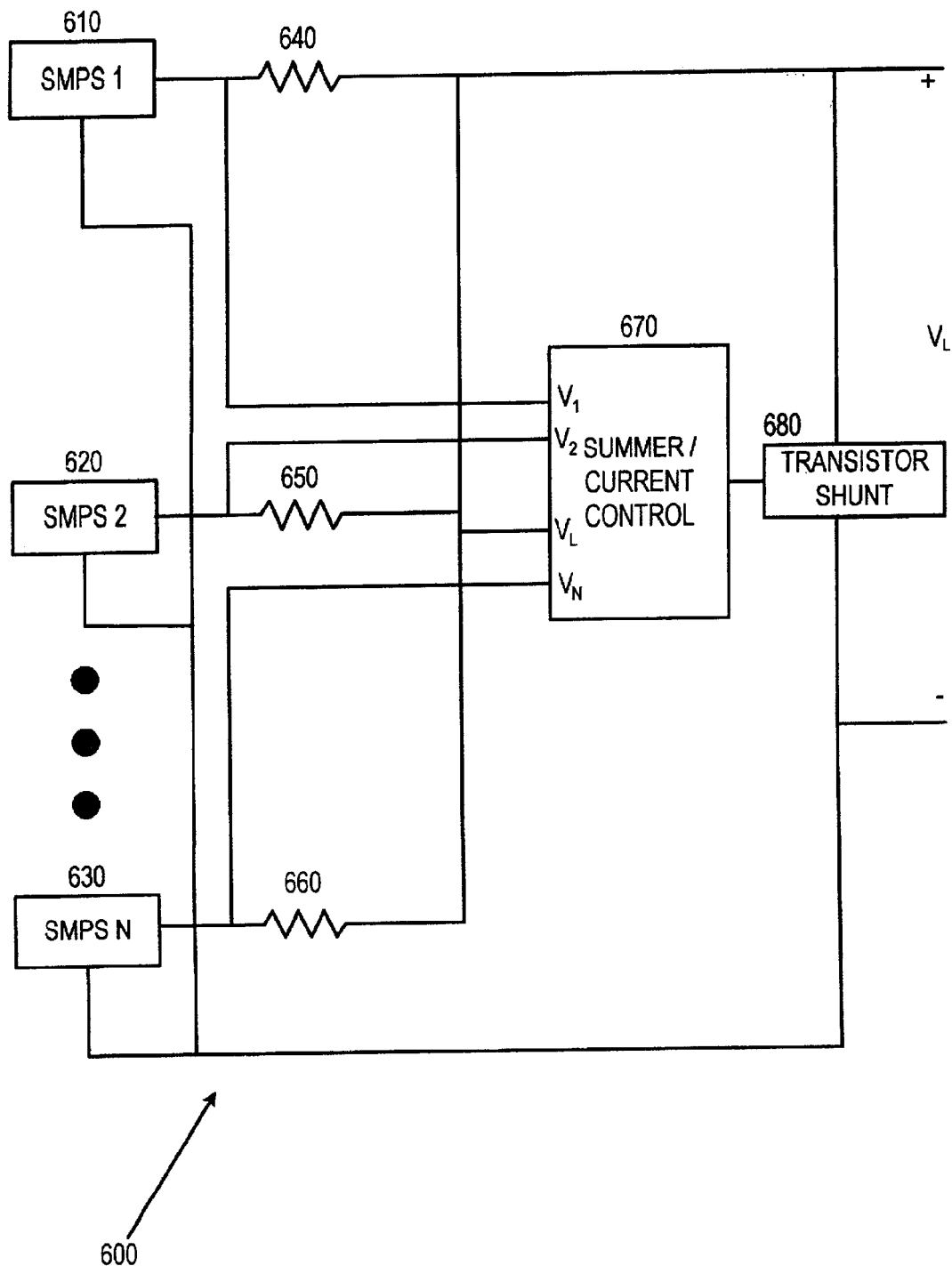
FIG. 6 illustrates a block diagram Of one embodiment of a current controlled voltage regulator.

In accordance with one embodiment of the invention, FIG. 6 illustrates SMPS 610, 620, . . . , 630 coupled in parallel to supply $V_L$. The parallel configuration of SMPS 610, 620, . . . , 630 may be necessary for high current applications, such as providing power to a microprocessor (not shown), which can demand 60 amps or more of load current. Summer/current control 670 provides voltage summing capability such that voltage $V_1, V_2, \ldots, V_n$ are summed to produce the cumulative voltage transient at load voltage $V_L$. Transistor shunt 680 operates in conjunction with summer/current control 670 to substantially eliminate the cumulative voltage transient at $V_L$ as discussed earlier.

Figure 7:
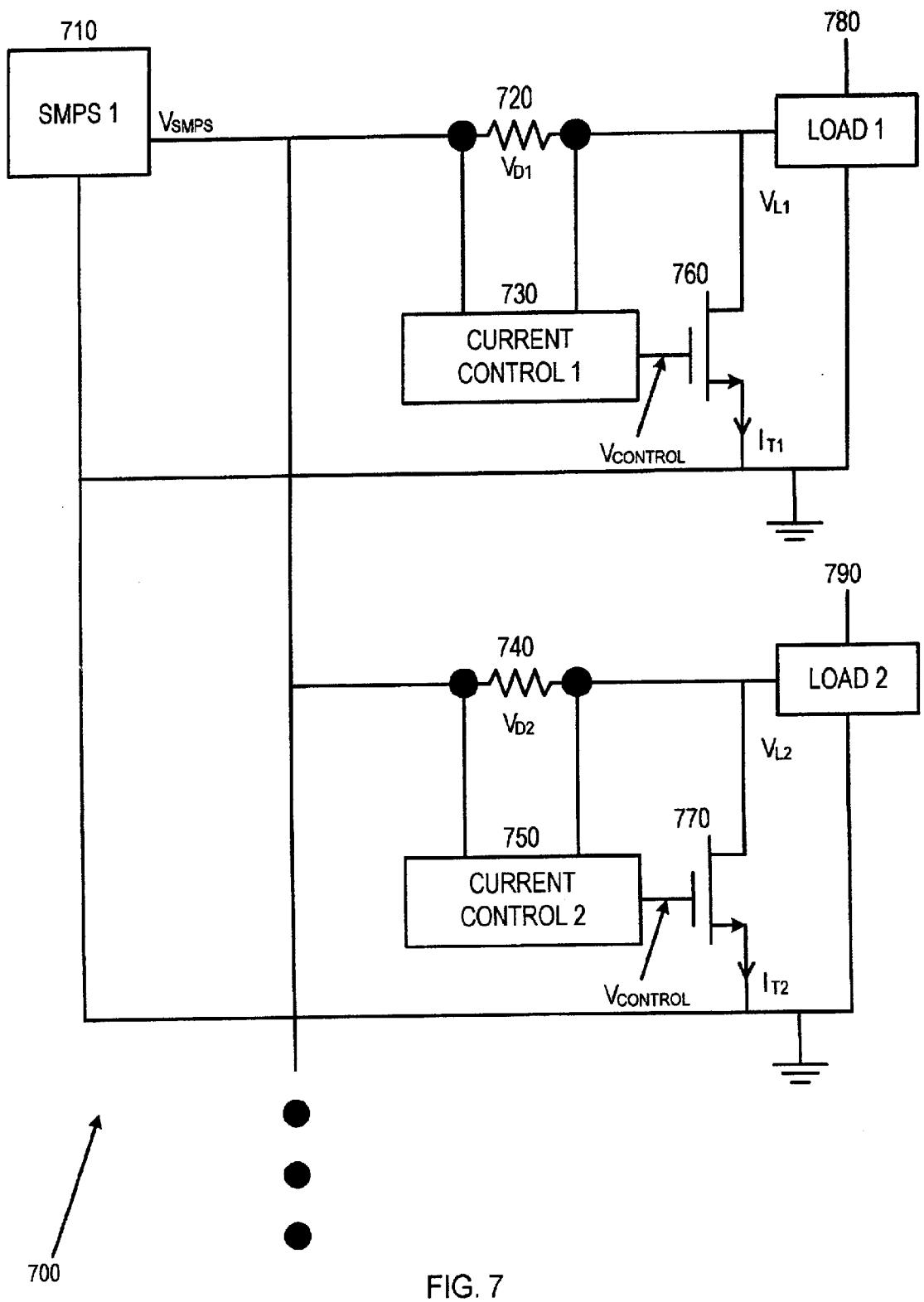
FIG. 7 illustrates a block diagram of one embodiment of a current controlled voltage regulator.

In accordance with one embodiment of the invention, FIG. 7 illustrates SMPS 710 supplying power to loads 780, 790, etc. FIG. 7 depicts power distribution of voltage $V_L$ to a multitude of loads, where each load may be multiple cells within an IC, multiple ICs on a Printed Circuit Board (PCB), multiple PCBs within a system, etc. Each load 780, 790, etc. is provided individual current controls 730, 750, etc. and individual transistor shunts 760, 770, etc. to individually control voltage transients at loads 780, 790, etc. as discussed earlier. Embodiments employing multiple SMPS and multiple loads are also possible as apparent to one of ordinary skill in the art.

Figure 8:
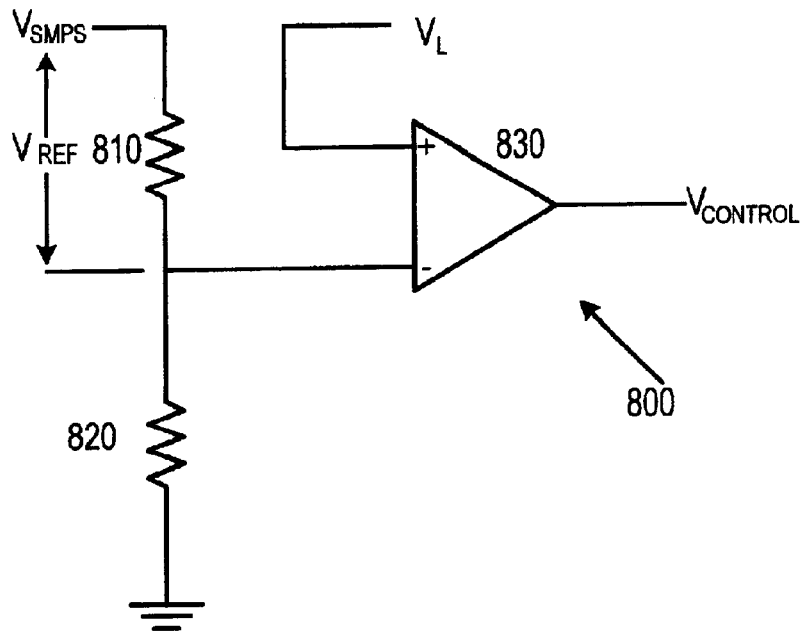
FIG. 8 illustrates a schematic diagram of a current control circuit.

FIG. 8 illustrates an embodiment of current control 800. The operation and connectivity of current control 800 is explained in conjunction with FIGS. 3 and 4. It should be understood, however, that current control 800 may be implemented in each of FIGS. 4–7. Amplifier 830 is coupled to receive the load voltage $V_L$ at the non-inverting input. The inverting input of amplifier 830 is coupled at the common terminals of series connected resistors 810 and 820. A second terminal of resistor 810 is coupled to receive the SMPS voltage $V_{SMPS}$.

In operation, current control circuit 800 divides the SMPS voltage $V_{SMPS}$ using resistors 810 and 820 and applies the divided SMPS voltage to the inverting input of amplifier 830. The divided SMPS voltage creates a reference voltage $V_{REF}$, such that through the operation of amplifier 830, $V_{CONTROL}$ is adjusted such that conductivity state of transistor 470 maintains $V_d$ substantially equal to $V_{REF}$. Amplifier 830 compares the load voltage $V_L$ with the divided SMPS voltage $V_{SMPS}$ to produce an error voltage $V_{CONTROL}$, which is then applied to the control terminal of transistor 470. It can be seen, that during the transient condition at time T1 of FIG. 3 caused by load 420, the voltage $V_L$ tends to increase in magnitude, thereby increasing the magnitude of error voltage $V_{CONTROL}$ due to the operation of amplifier

830. Increasing the magnitude of $V_{CONTROL}$ is effective to increase the conductivity state of transistor 470, allowing transistor 470 to conduct the excess current caused by the reduction in the loading requirements of load 420, which substantially eliminates the transient voltage at node 490 as discussed earlier. Conversely, during the transient condition at time T3 of FIG. 3, the load voltage $V_L$ tends to decrease in magnitude, thereby decreasing the magnitude of error voltage $V_{CONTROL}$. Decreasing the magnitude of $V_{CONTROL}$ is effective to decrease the conductivity state of transistor 470, reducing the amount of current conducted by transistor 470, which substantially eliminates the transient voltage at node 490 as discussed earlier. Although the SMPS voltage $V_{SMPS}$ is shown to be divided by resistors 810 and 820, alternate circuits may be used to generate $V_{REF}$, such as a battery, zener diode, or other reference sources.

Figure 9:
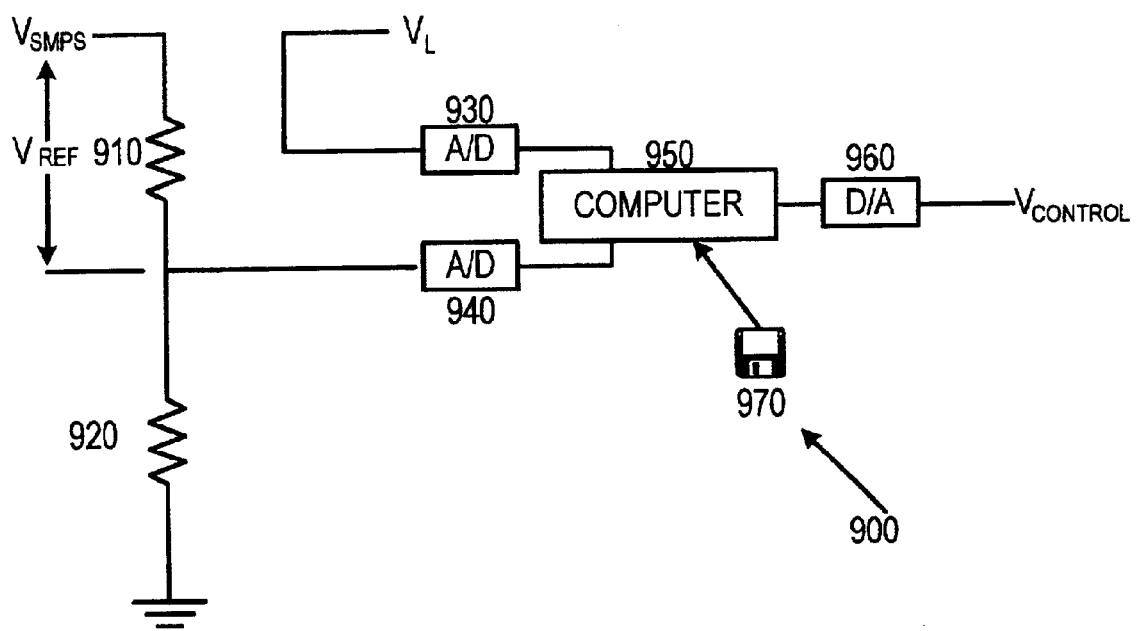
FIG. 9 illustrates one embodiment of a current control circuit.

In accordance with one embodiment of the invention, FIG. 9 illustrates an alternate implementation of current control 900. The operation and connectivity of current control 900 is explained in conjunction with FIGS. 3 and 4. It should be understood, however, that current control goo may be implemented in each of FIGS. 4–7. Analog to Digital Converter (A/D) 930 is coupled to receive load voltage $V_L$. A/D 940 is coupled to the common terminals of series connected resistors 910 and 920. A second terminal of resistor 910 is coupled to receive SMPS voltage $V_{SMPS}$. The outputs of A/D 930 and 940 are coupled to computer 950. Computer 950 is coupled to Digital to Analog Converter (D/A) 960, which ultimately provides $V_{CONTROL}$. Storage media 970 is introduced into computer 950, which contains instructions executable by the computer that indicate how data from A/D 930 and 940 is to be manipulated and how data transmitted to D/A 960 is to be configured. Although $V_{CONTROL}$ is illustrated to be generated by D/A 960, which ultimately controls the conductivity state of transistor 470, an alternate current control, such as a digitally controlled current sink may be used.

In operation, current control circuit 900 divides the SMPS voltage $V_{SMPS}$ using resistors 910 and 920 and applies the divided SMPS voltage $V_{SMPS}$ to A/D 940. A/D 930 is coupled to receive the load voltage $V_L$. A/D 930 and A/D 940 produce digital representations of their analog inputs. Computer 950 is coupled to receive the digital representations and computes the difference between A/D 930 voltage and A/D 940 voltage according to instructions obtained from storage media 970. During the transient condition at time T1 of FIG. 3, the load voltage $V_L$ tends to increase in magnitude, thereby causing the difference voltage calculated by computer 950 to increase the magnitude of error voltage $V_{CONTROL}$ Increasing the magnitude of $V_{CONTROL}$ is effective to increase the conductivity state of transistor 470, allowing transistor 470 to conduct the excess current caused by the reduction in the loading requirements of load 420, which substantially eliminates the transient voltage at node 490 as discussed earlier. Conversely, during the transient condition at time T3 of FIG. 3, the load voltage $V_L$ tends to decrease in magnitude, thereby causing the difference voltage calculated by computer 950 to decrease the magnitude of error voltage $V_{CONTROL}$. Decreasing the magnitude of $V_{CONTROL}$ is effective to decrease the conductivity state of transistor 470, reducing the amount of current conducted by transistor 470, which substantially eliminates the transient voltage at node 490 as discussed earlier.

In summary, a novel apparatus and method is presented to substantially eliminate voltage ripple and voltage transients in a switched mode power supply application, using a current controlled voltage regulator. Various embodiments are presented allowing various high current and multiple output voltage regulators to substantially eliminate variations in output voltage due to ripple and load induced transients.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A current controlled voltage regulator for regulating a voltage at a load, comprising:
   a connector to connect to a power source;
   at least one resistive element coupled in series between the power source and the load;
   a control circuit coupled across the at least one resistive element to receive first and second signals indicative of a drive level of the voltage regulator and to provide a control signal in response to a difference between the first and second signals; and
   a conduction device coupled across the load and coupled to the control circuit to receive the control signal and to decrease conduction if the difference increases and increase conduction if the difference decreases, wherein the change in conduction is substantially proportional to the difference between the first and second signals, and wherein a substantially constant voltage is maintained across the load.

2. The current controlled voltage regulator of claim 1, wherein the control circuit comprises an operational amplifier.

3. A current controlled voltage regulator, comprising:
   a control circuit coupled to receive first and second signals indicative of a drive level of the voltage regulator and coupled to provide a control signal in response to a difference between the first and second signals, wherein the control circuit includes
      a first conversion device coupled to receive the first signal and coupled to provide a digital representation of the first signal;
      a second conversion device coupled to receive the second signal and coupled to provide a digital representation of the second signal; and
      a third conversion device coupled to receive the first and second digital representations and coupled to provide a difference between the first and second digital representations; and
   a conduction device coupled to receive the control signal and coupled to decrease conduction if the difference increases and increase conduction if the difference decreases, wherein the change in conduction is substantially proportional to the difference between the first and second signals.

4. The current controlled voltage regulator of claim 1, wherein the conduction device comprises a transistor having a first conduction terminal coupled to receive the first signal and a control terminal coupled to receive the control signal.

5. The current controlled voltage regulator of claim 4, wherein the transistor includes a field effect transistor.

6. An article of manufacture comprising a program storage medium readable by a computer, the computer coupled to at least one resistive element coupled in series between a power source and a load and coupled to a conduction device coupled across the load, the medium tangibly embodying instructions executable by the computer to perform steps comprising:

receiving first and second signals from terminals of the at least one resistive element, the first and second signals being indicative of a drive level of the power source;

computing a difference between the first and second signals; and controlling a conductive state of the conduction device in response to the difference, wherein the conductive state is changed substantially in proportion to the difference to maintain a substantially constant voltage across the load.

7. The article of manufacture of claim 6, wherein receiving first and second signals comprises using the at least one resistive element to develop a potential difference between the first and second signals, wherein the potential difference is indicative of the drive level.

8. The article of manufacture of claim 6, wherein computing the difference comprises:

receiving the first signal at an input of a first conversion device;

receiving the second signal at an input of a second conversion device; and generating the difference at the output of a third conversion device.

9. A method of operating a current controlled voltage regulator, comprising:

generating first and second voltage signals indicative of a drive level of the voltage regulator, the first and second voltage signals being generated at endpoints of at least one resistive component coupled in series with a power source and a load;

receiving the first and second voltage signals and measuring a difference between the first and second voltage signals;

coupling a conduction device across the load; and controlling a conductive state of the conduction device in response to the difference, wherein the conductive state is changed in proportion to the difference to maintain a substantially constant voltage across the load.

10. The method of claim 9, wherein receiving first and second voltage signals comprises using the resistive component to develop a potential difference between the first and second voltage signals, wherein the potential difference is indicative of the drive level.

11. The method of claim 9, wherein measuring the difference comprises:

receiving the first voltage signal at a first input of an amplifier;

receiving the second voltage signal at a second input of the amplifier; and generating the difference at the output of the amplifier.

12. The method of claim 9, wherein measuring the difference comprises:

receiving the first voltage signal at an input of a first conversion device;

receiving the second voltage signal at an input of a second conversion device; and generating the difference at the output of a third conversion device.

13. In a power supply, a voltage regulator controlling output current to substantially eliminate voltage variations, the voltage regulator comprising:

a current control circuit coupled to receive first and second signals indicative of a drive level of the voltage regulator and coupled to provide a control signal in response to a difference between the first and second signals, wherein the current control circuit includes a first conversion device coupled to receive the first signal and coupled to provide a digital representation of the first signal;

a second conversion device coupled to receive the second signal and coupled to provide a digital representation of the second signal; and a third conversion device coupled to receive the first and second digital representations and coupled to provide a signal substantially proportional to the difference between the first and second digital representations; and a current conduction device coupled to receive the control signal and coupled to increase current conduction if the difference decreases and decrease current conduction if the difference increases, wherein the chance in conduction is substantially proportional to the difference between the first and second signals.

14. A current controlled voltage regulator for use in regulating a load voltage supplied by a power supply to a load, comprising:

sensing means coupled in series with the power supply and the load for providing first and second signals indicative of a drive level of the voltage regulator;

controlling means coupled across the sensing means for receiving the first and second signals and for providing a control signal in response to a difference between the first and second signals; and conducting means coupled across the load and coupled to the control means for receiving the control signal and for increasing conduction if the difference decreases and decreasing conduction if the difference increases, wherein the change in conduction is substantially proportional to the difference between the first and second signals to maintain a substantially constant voltage across the load.

15. The current controlled voltage regulator of claim 14, wherein the controlling means comprises an operational amplifier.

16. A current controlled voltage regulator, comprising:

controlling means coupled to receive first and second signals indicative of a drive level of the voltage regulator and coupled to provide a control signal in response to a difference between the first and second signals wherein the control means includes a first conversion means coupled to receive the first signal and coupled to provide a digital representation of the first signal;

a second conversion means coupled to receive the second signal and coupled to provide a digital representation of the second signal; and a third conversion means coupled to receive the first and second digital representations and coupled to provide a signal substantially proportional to the difference between the first and second digital representations; and conducting means coupled to receive the control signal and coupled to increase conduction if the difference decreases and decrease conduction if the difference increases, wherein the change in conduction is substantially proportional to the difference between the first and second signals.

17. The current controlled voltage regulator of claim 14, wherein the conducting means comprises a transistor having a first conduction terminal coupled to receive the first signal and a control terminal coupled to receive the control signal.

18. The current controlled voltage regulator of claim 17, wherein the transistor includes a field effect transistor.

19. The current controlled voltage regulator of claim 1, wherein the control circuit comprises:

a first conversion device coupled to receive the first signal and coupled to provide a digital representation of the first signal;

a second conversion device coupled to receive the second signal and coupled to provide a digital representation of the second signal; and a third conversion device coupled to receive the first and second digital representations and coupled to provide a difference between the first and second digital representations.

\* \* \* \* \*